(12) United States Patent
Lovati et al.

(10) Patent No.: US 11,973,445 B2
(45) Date of Patent: Apr. 30, 2024

(54) ACTUATOR WITH AUTOMATIC FORCE SETTING AND SELF-CALIBRATION

(71) Applicant: Johnson Controls Tyco IP Holdings LLP, Milwaukee, WI (US)

(72) Inventors: Mattia Lovati, Santo Stefano Ticino (IT); Michele Carozzi, Lomagna (IT); Alessio Ghisla, Gardone val Trompia (IT); Stefano Quadri, Marone (IT); Achim Reinders, Essen (DE); Claudio Viscardi, Casatenovo (IT)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/742,963

(22) Filed: May 12, 2022

(65) Prior Publication Data
US 2022/0368257 A1 Nov. 17, 2022

Related U.S. Application Data

(60) Provisional application No. 63/188,240, filed on May 13, 2021.

(51) Int. Cl.
*H02P 23/14* (2006.01)

(52) U.S. Cl.
CPC .................................. *H02P 23/14* (2013.01)

(58) Field of Classification Search
CPC .. H02P 23/14; H02P 6/08; H02P 6/182; F24F 2013/1433; F24F 2013/146; F24F 11/70; F24F 13/1426
USPC .......... 318/445, 400.34, 400.32, 400.01, 700
See application file for complete search history.

(56) References Cited

U.S. PATENT DOCUMENTS

| | | |
|---|---|---|
| 5,306,988 A | 4/1994 | Carobolante et al. |
| 5,481,167 A | 1/1996 | Rohrbaugh et al. |
| 5,554,916 A | 9/1996 | Kaneda et al. |
| 5,672,948 A | 9/1997 | Cohen et al. |
| 5,767,654 A | 6/1998 | Menegoli et al. |
| 5,789,895 A | 8/1998 | Lee |
| 5,982,133 A | 11/1999 | Murakami et al. |
| 6,017,143 A | 1/2000 | Eryurek et al. |

(Continued)

FOREIGN PATENT DOCUMENTS

EP 3 660 372 A1 6/2020

OTHER PUBLICATIONS

EP Office action and Search Report on EP Appl. Ser. No. 19167749.1 dated Oct. 29, 2019 (11 pages).

(Continued)

*Primary Examiner* — David Luo
(74) *Attorney, Agent, or Firm* — Foley & Lardner LLP

(57) ABSTRACT

Systems and methods for auto-calibration of current supplied to a motor of an actuator may include supplying an initial electrical current to the motor. One or more sensors may measure a condition corresponding to the motor as the initial electrical current is supplied to the motor. A processing circuit may compare the measured condition to an expected condition. The processing circuit may adjust a supply of the initial electrical current to the motor until the measured condition substantially matches the expected condition. The processing circuit may store data regarding an association between the adjusted supply of initial electrical current and the expected condition.

20 Claims, 14 Drawing Sheets

(56) References Cited

U.S. PATENT DOCUMENTS

| | | | |
|---|---|---|---|
| 6,034,493 A | 3/2000 | Fisher et al. | |
| 6,040,671 A | 3/2000 | Brito et al. | |
| 6,198,243 B1 | 3/2001 | Ritmanich et al. | |
| 6,269,784 B1 | 8/2001 | Newton | |
| 6,686,714 B2 | 2/2004 | Trifilo | |
| 7,235,939 B2 | 6/2007 | Viti | |
| 7,514,894 B2 | 4/2009 | Hoogzaad | |
| 8,022,646 B1 | 9/2011 | Sutardja et al. | |
| 8,148,928 B2 * | 4/2012 | Laulanet | H02P 6/182 318/400.11 |
| 8,169,178 B2 | 5/2012 | Letor et al. | |
| 8,473,229 B2 | 6/2013 | Kucera et al. | |
| 8,588,983 B2 | 11/2013 | Grabinger et al. | |
| 8,693,132 B1 | 4/2014 | Koay et al. | |
| 8,972,064 B2 | 3/2015 | Grabinger et al. | |
| 9,509,243 B2 | 11/2016 | Viscardi et al. | |
| 10,644,624 B1 * | 5/2020 | Viscardi | H02P 6/182 |
| 2013/0116832 A1 | 5/2013 | Grabinger et al. | |
| 2013/0116834 A1 | 5/2013 | Grabinger et al. | |
| 2015/0260425 A1 | 9/2015 | Romanowich et al. | |
| 2015/0333669 A1 | 11/2015 | Alexander et al. | |
| 2015/0362236 A1 | 12/2015 | Jiang et al. | |
| 2016/0061480 A1 | 3/2016 | Alexander | |
| 2016/0141985 A1 * | 5/2016 | Viscardi | H02P 8/34 318/696 |
| 2017/0295058 A1 | 10/2017 | Gottschalk et al. | |

OTHER PUBLICATIONS

EP Office Action on EP Appl. Ser. No. 19167749.1 dated Dec. 15, 2021 (5 pages).
EP Office Action on EP Appl. Ser. No. 19167749.1 dated Jan. 30, 2020 (10 pages).
EP Office Action on EP Appl. Ser. No. 19167749.1 dated Mar. 12, 2021 (5 pages).
EP Office Action on EP Appl. Ser. No. 19167749.1 dated May 2, 2022 (6 pages).
Extended European Search Report on EP Appl. Ser. No. EP 22 20 6877 dated Jan. 26, 2023 (13 pages).

* cited by examiner

ACTUATOR WITH AUTOMATIC FORCE SETTING AND SELF-CALIBRATION

CROSS-REFERENCE TO RELATED APPLICATION

This application claims the benefit of and priority to U.S. Provisional Patent Application No. 63/188,240, filed May 13, 2021, the contents of which are incorporated herein by reference in its entirety.

BACKGROUND

The present disclosure relates generally to actuators in a heating, ventilating, or air conditioning (HVAC) system. The present disclosure relates more particularly to the automatic calibration of actuators prior to installation.

HVAC actuators are used to operate a wide variety of HVAC components such as air dampers, fluid valves, air handling units, and other components that are used in HVAC systems. For example, an actuator can be coupled to a damper in an HVAC system and can be used to drive the damper between an open position and a closed position. An HVAC actuator typically includes a motor and a drive device (e.g., a hub, a drive train) that is driven by the motor and coupled to the HVAC component.

Valves regulate, direct, and/or control the flow of a fluid (e.g., gases, liquids, fluidized solids, slurries) by opening, closing, or partially obstructing various passageways. Valves are often categorized based on the mechanism used to control fluid flow (e.g., ball valves, butterfly valves, choke valves, piston valves, plug valves, poppet valves). In some embodiments, the operating positions of the valve are binary (i.e., open or closed). In other embodiments, the valve may have any number of intermediate positions between a fully open position and a fully closed position.

Back Electromotive Force

Back electromotive force (BEMF), also known as counter-electromotive force (CEMF) is a voltage created in an electric motor's coils when its rotor is in motion. It is equivalent to the electromotive force (EMF) that is induced in an electrical generator. In a motor the BEMF is generated in opposition to the applied voltage.

The theoretical value of a motor BEMF ($\varepsilon_b$) can be calculated using Faraday's law of induction. However, variations in materials may cause the amount of magnetic flux ($\Phi$) to vary between motors. Inconsistencies in manufacture may also cause the number of windings (N) to vary between motor cores.

$$\varepsilon_b = -N\frac{\Delta\Phi}{\Delta t}$$

The net voltage across a motor is equal to the supply voltage plus the motor BEMF, where the motor BEMF has a negative value due to its opposition to the supply voltage.

Net voltage across a motor=supply voltage+BEMF

Hence the motor BEMF can be determined by measuring the net voltage across a motor, and then subtracting the voltage supplied to the motor.

Motor BEMF is proportional to the speed of a motor, and inversely proportional to the current. Motor BEMF increases as the speed of the motor increases, and in doing so the opposition to the supply voltage increases, which reduces the net voltage across the motor, and reduces the current in the circuit.

Placing a load on a motor may reduce the rotational speed, which reduces the motor BEMF. The reduction in motor BEMF causes an increase in the net voltage across the motor, and then causes the current drawn by the motor to increase. In a simple circuit where a motor is connected to a power source, the current may reach a maximum value when the rotor is stationary and motor BEMF is zero. In an actuator, this may occur when power is applied to a stationary motor. It may also occur when a load on the motor is sufficient to prevent rotation, such as when the object that an actuator is driving has reached the end of its range of travel and cannot move any further. This is referred to as a stall.

SUMMARY

One implementation of the present disclosure is to obtain a desired force output from an actuator by having the actuator motor work against a known load, measure the motor BEMF, and apply a correction to the motor current. Another implementation of the present disclosure is to obtain a desired force output from an actuator by having the actuator motor work against a force sensor, measure the force exerted by the motor, measure the motor BEMF, and apply a correction to the motor current.

In one aspect, this disclosure is directed to a method of calibrating a supply of electrical current in an actuator. The method may include supplying an initial electrical current to a motor of an actuator. The method may include measuring a back-electromotive force (BEMF) corresponding to the motor as the initial electrical current is supplied to the motor. The method may include comparing the measured BEMF to an expected BEMF. The method may include adjusting a supply of the initial electrical current to the motor until the measured BEMF substantially matches the expected BEMF. The method may include storing data regarding an association between the adjusted supply of initial electrical current and the expected BEMF.

In another aspect, this disclosure is directed to a method of calibrating electrical current supply to an actuator. The method may include determining, for a motor, a relationship between values of at least two of an electrical current supplied to the motor, a back-electromotive force (BEMF) generated by the motor, or a force exerted by the motor. The method may include coupling the motor to a force sensor. The method may include supplying an initial electrical current to the motor. The method may include measuring values of at least one of the BEMF generated by the motor or the force exerted by the motor while the initial current is supplied to the motor. The method may include adjusting a supply of the initial electrical current to the motor based on the determined relationship and the measured values. The method may include storing data regarding an association between the adjusted supply of the initial electrical current and the determined relationship.

In still another aspect, this disclosure is directed to a system for calibrating electrical current supply to a motor. The system may include a motor. The system may include one or more sensors configured to measure a condition corresponding to the motor. The system may include a processing circuit comprising one or more processors and memory. The memory may store instructions that, when executed by the one or more processors, cause the one or more processors to supply an initial electrical current to the motor. The instructions may further cause the one or more processors to measure, via the one or more sensor(s), the condition corresponding to the motor as the initial electrical current is supplied to the motor. The instructions may further cause the one or more processors to compare the measured condition to an expected condition. The instructions may further cause the one or more processors to adjust a supply of the initial electrical current to the motor until the measured condition substantially matches the expected condition. The instructions may further cause the one or more processors to store data regarding an association between the adjusted supply of initial electrical current and the expected condition.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, an HVAC actuator with automatic force setting and self-calibration is shown, according to some embodiments.

The valves described herein may be used to regulate fluid flow from multiple fluid supplies and/or to multiple fluid returns. In some embodiments, the valve is a three-way valve having a valve body and a valve member. In other embodiments, the valve is a six-way valve having a valve body and a valve member. The valve body may include a valve chamber and a plurality of ports in fluid communication with the valve chamber (e.g., a first port, a second port, a third port). The valve may be controlled (e.g., by an actuator and/or a controller) by rotating the valve member within the valve chamber.

The actuator may be a damper actuator, a valve actuator, a fan actuator, a pump actuator, or any other type of actuator that can be used in a HVAC system. The actuator includes a motor and a drive device driven by the motor. In some embodiments, the motor is a brushless direct current (BLDC) motor. The drive device is coupled to a movable HVAC component for driving the movable HVAC component between multiple positions.

Advantageously, the disclosed methods and systems more accurate calibration of actuators with reduced human intervention, which in turn results in improved efficiency and accuracy of actuators in operation.

HVAC Valve and Actuator Assemblies

Figure 1:
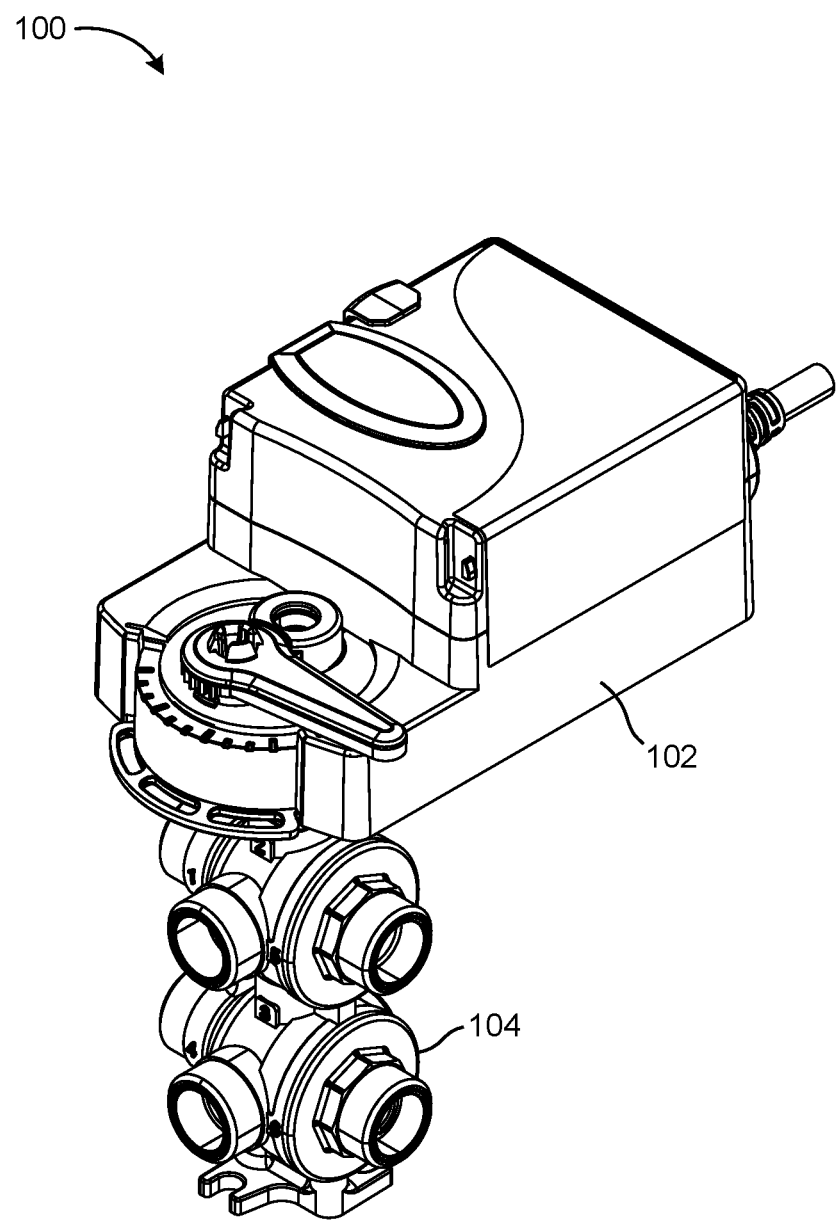
FIG. 1 is a perspective view drawing of a valve and actuator assembly, according to some embodiments.

Referring now to FIG. 1, a view of an actuator and valve assembly 100 is shown, according to some embodiments. Assembly 100 may be used in an HVAC system, a waterside system, an airside system, or a building management system (BMS). Assembly 100 is shown to include an actuator 102 coupled to a six-way valve assembly 104. Actuator 102 may be configured to actuate a valve member of the six-way valve 104 and control fluid flow through the valve body to regulate a flow of fluid through a conduit, pipe, or tube.

Figure 2:
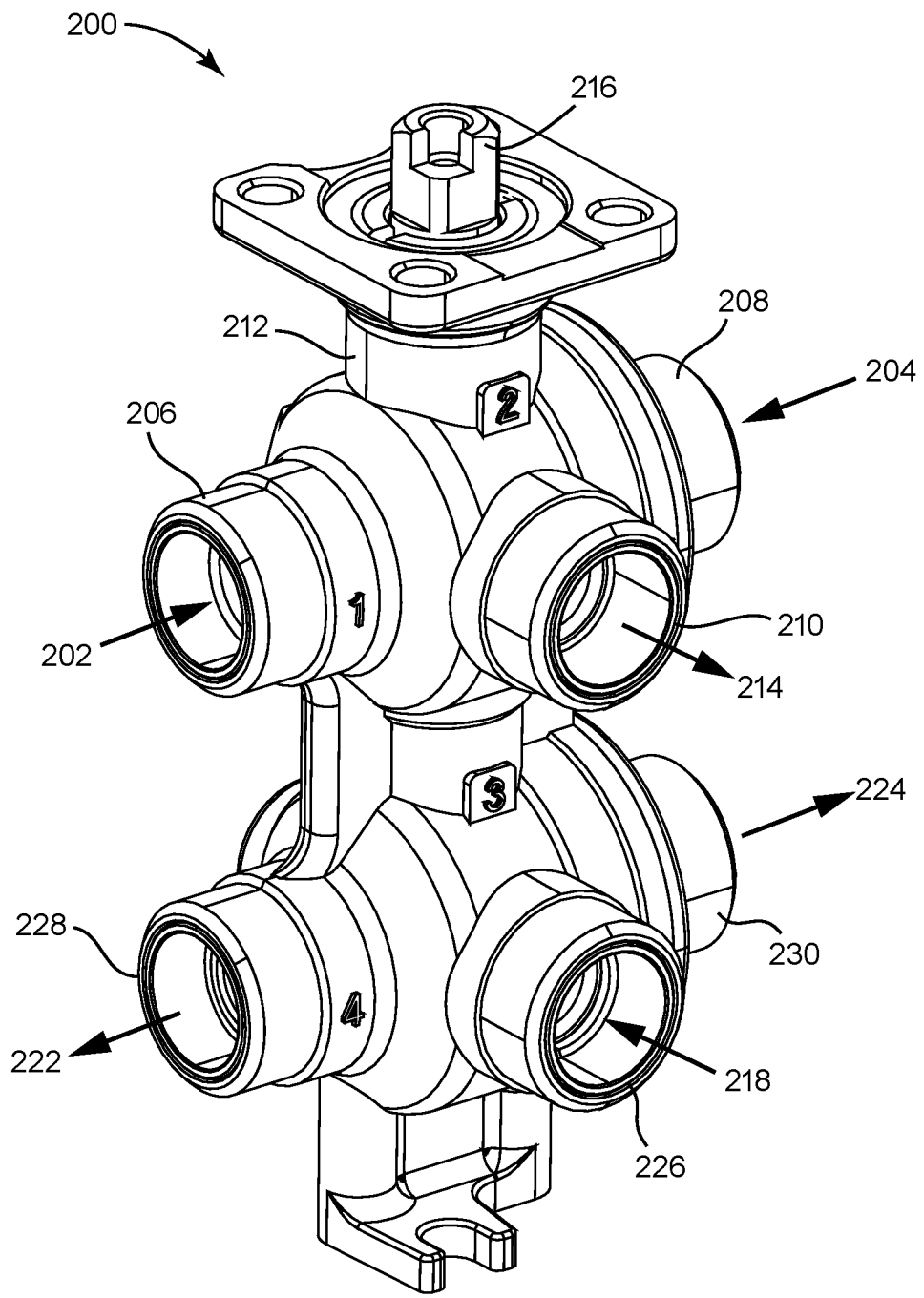
FIG. 2 is a perspective view drawing of a six-way valve that can be implemented in the valve and actuator assembly of FIG. 1, according to some embodiments.

Referring now to FIG. 2, a six-way valve assembly 200 is shown according to an exemplary embodiment. In some embodiments, valve assembly 200 is identical or substantially similar to valve assembly 104 depicted in FIG. 1. Six-way valve assembly 200 is shown to include a six-way valve body 212 and a valve member 216. Six-way valve body 212 may combine two three-way valve bodies in a stacked orientation. In the stacked orientation, a single valve member 216 can be used to control fluid flow through both of the three-way valve bodies. Advantageously, six-way valve assembly 200 may be controlled by a single actuator (e.g., actuator 102) acting upon valve member 216.

Figure 3:
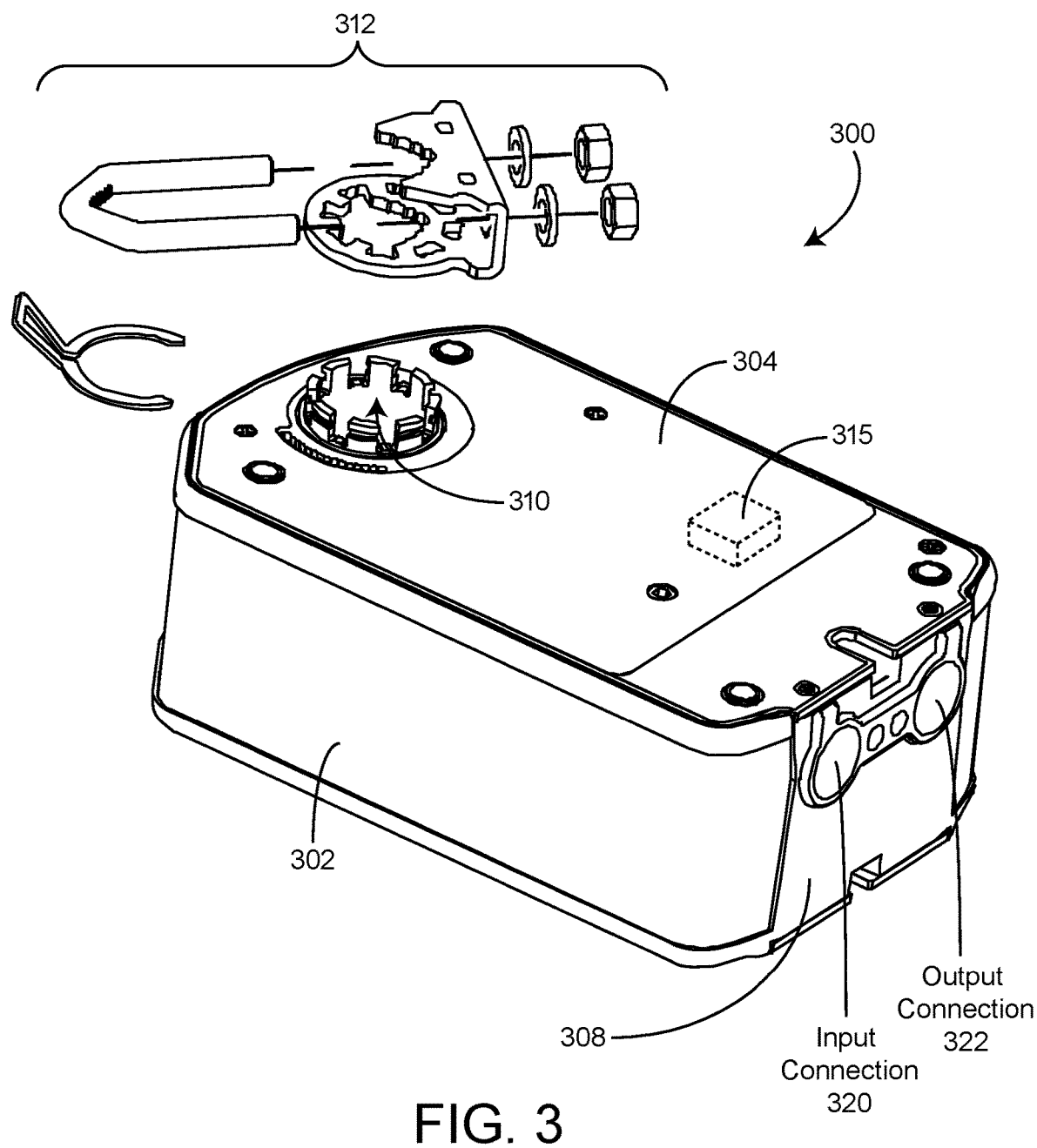
FIG. 3 is a perspective view drawing of an actuator that can be implemented in the valve and actuator assembly of FIG. 1, according to some embodiments.
Figure 5:
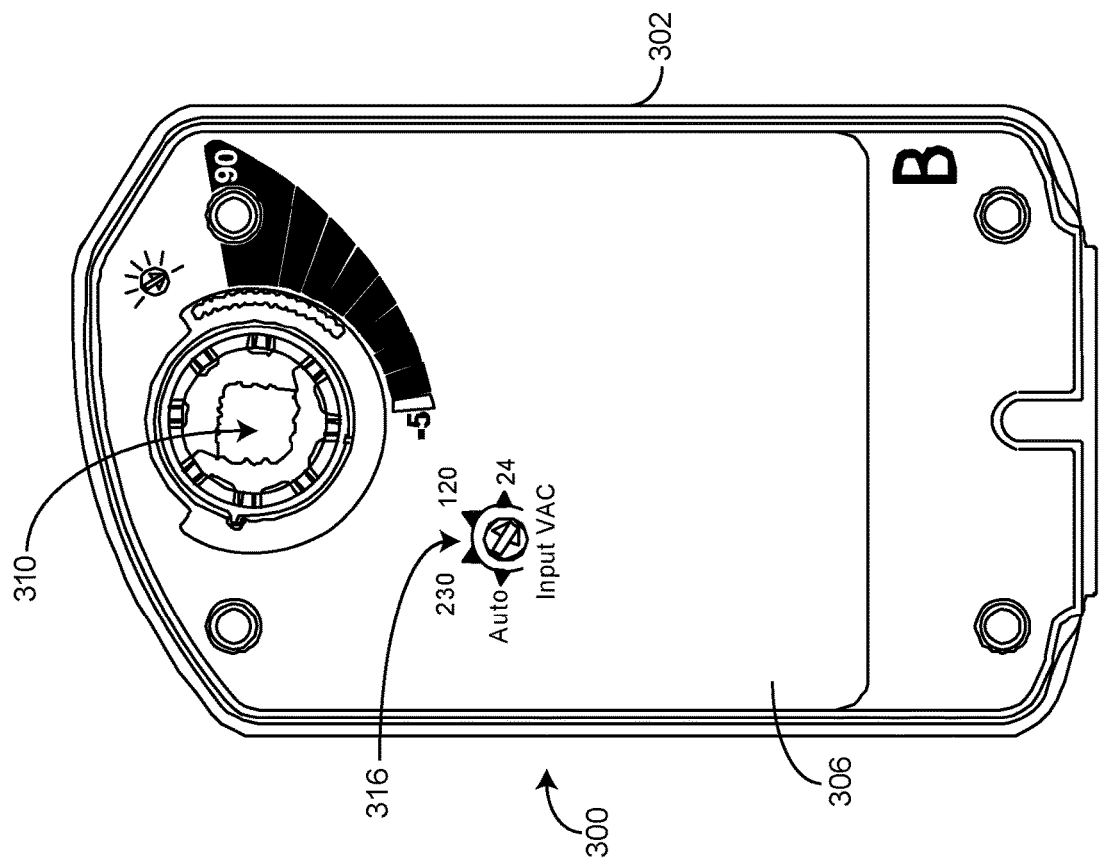
FIG. 5 is a bottom view drawing of the actuator of FIG. 3, according to some embodiments.
Figure 4:
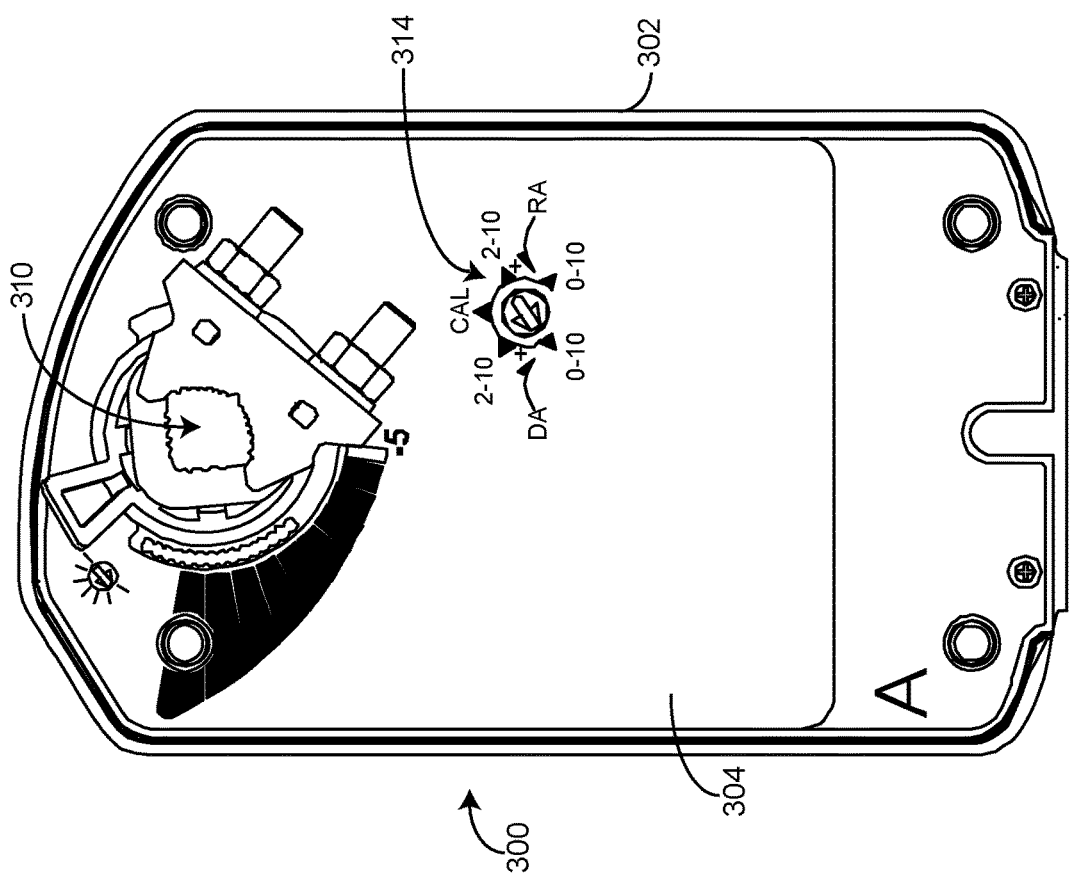
FIG. 4 is a top view drawing of the actuator of FIG. 3, according to some embodiments.

Referring now to FIGS. 3-5, an actuator 300 for use in a HVAC system is shown, according to an exemplary embodiment. For example, actuator 300 may be a damper actuator, a valve actuator, a fan actuator, a pump actuator, or any other type of actuator that can be used in a HVAC system or BMS. In various embodiments, actuator 300 may be a linear actuator (e.g., a linear proportional actuator), a non-linear actuator, a spring return actuator, or a non-spring return actuator.

Actuator 300 is shown to include a housing 302 having a front side 304 (i.e., side A), a rear side 306 (i.e., side B) opposite front side 304, and a bottom 308. Housing 302 may contain the mechanical and processing components of actuator 300. In some embodiments, housing 302 contains a brushless direct current (BLDC) motor and a processing circuit configured to provide a pulse width modulated (PWM) DC output to control the speed of the BLDC motor. The processing circuit may be configured to compare a representation of the electric current output to the BLDC motor to a threshold and may hold the PWM DC output in an off state when the current exceeds the threshold. The processing circuit may also be configured to set the PWM DC output to zero and then ramp up the PWM DC output when actuator 300 approaches an end stop.

In some embodiments, Actuator 300 contains a brushed DC motor, stepper motor, or other type of DC motor.

Actuator 300 is shown to include a drive device 310. Drive device 310 may be a drive mechanism, a hub, or other device configured to drive or effectuate movement of a HVAC system component. For example, drive device 310 may be configured to receive a shaft of a damper, a valve, or any other movable HVAC system component in order to drive (e.g., rotate) the shaft. In some embodiments, actuator 300 includes a coupling device 312 configured to aid in coupling drive device 310 to the movable HVAC system component. For example, coupling device 312 may facilitate attaching drive device 310 to a valve or damper shaft.

Actuator 300 is shown to include an input connection 320 and an output connection 322. In some embodiments, input connection 320 and output connection 322 are located along bottom 308. In other embodiments, input connection 320 and output connection 322 may be located along one or more other surfaces of housing 302. Input connection 320 may be configured to receive a control signal (e.g., a voltage input signal) from an external system or device. Actuator 300 may use the control signal to determine an appropriate PWM DC output for the BLDC motor. In some embodiments, the control signal is received from a controller such as an AHU controller, an economizer controller, a supervisory controller, a zone controller, a field controller, an enterprise level controller, a motor controller, an equipment-level controller (e.g., an actuator controller) or any other type of controller that can be used in a HVAC system or BMS.

In some embodiments, the control signal is a DC voltage signal. Actuator 300 may be a linear proportional actuator configured to control the position of drive device 310 according to the value of the DC voltage received at input connection 320. For example, a minimum input voltage (e.g., 0.0 VDC) may correspond to a minimum rotational position of drive device 310 (e.g., 0 degrees, −5 degrees), whereas a maximum input voltage (e.g., 10.0 VDC) may correspond to a maximum rotational position of drive device 310 (e.g., 90 degrees, 95 degrees). Input voltages between the minimum and maximum input voltages may cause actuator 300 to move drive device 310 into an intermediate position between the minimum rotational position and the maximum rotational position. In other embodiments, actuator 300 may be a non-linear actuator or may use different input voltage ranges or a different type of input signal (e.g., AC voltage or current) to control the position and/or rotational speed of drive device 310.

In some embodiments, the control signal is an AC voltage signal. Input connection 320 may be configured to receive an AC voltage signal having a standard power line voltage (e.g., 120 VAC or 230 VAC at 50/60 Hz). The frequency of the voltage signal may be modulated (e.g., by a controller for actuator 300) to adjust the rotational position and/or speed of drive device 310. In some embodiments, actuator 300 uses the voltage signal to power various components of actuator 300. Actuator 300 may use the AC voltage signal received via input connection 320 as a control signal, a source of electric power, or both. In some embodiments, the voltage signal is received at input connection 320 from a power supply line that provides actuator 300 with an AC voltage having a constant or substantially constant frequency (e.g., 120 VAC or 230 VAC at 50 Hz or 60 Hz). Input connection 320 may include one or more data connections (separate from the power supply line) through which actuator 300 receives control signals from a controller or another actuator (e.g., 0-10 VDC control signals).

In some embodiments, the control signal is received at input connection 320 from another actuator. For example, if multiple actuators are interconnected in a tandem arrangement, input connection 320 may be connected (e.g., via a communications bus) to the output data connection of another actuator. One of the actuators may be arranged as a master actuator with its input connection 320 connected to a controller, whereas the other actuators may be arranged as subordinate actuators with their respective input connections connected to the output connection 322 of the master actuator.

Output connection 322 may be configured to provide a feedback signal to a controller of the HVAC system or BMS in which actuator 300 is implemented (e.g., an AHU controller, an economizer controller, a supervisory controller, a zone controller, a field controller, an enterprise level controller). The feedback signal may indicate the rotational position and/or speed of actuator 300. In some embodiments, output connection 322 may be configured to provide a control signal to another actuator (e.g., a subordinate actuator) arranged in tandem with actuator 300. Input connection 320 and output connection 322 may be connected to the controller or the other actuator via a communications bus. The communications bus may be a wired or wireless communications link and may use any of a variety of disparate communications protocols (e.g., BACnet, LON, WiFi, Bluetooth, NFC, TCP/IP).

Still referring to FIGS. 3-5, actuator 300 is shown to include a first user-operable switch 314 located along front side 304 (shown in FIG. 4) and a second user-operable switch 316 located along rear side 306 (shown in FIG. 5). Switches 314-316 may be potentiometers or any other type of switch (e.g., push button switches such as switch 315, dials, flippable switches). Switches 314-316 may be used to set actuator 300 to a particular operating mode or to configure actuator 300 to accept a particular type of input. However, it should be understood that switches 314-316 are optional components and are not required for actuator 300 to perform the processes described herein. As such, one or more of switches 314-316 may be omitted without departing from the teachings of the present application.

Referring particularly to FIG. 4, switch 314 may be a mode selection switch having a distinct number of modes or positions. Switch 314 may be provided for embodiments in which actuator 300 is a linear proportional actuator that controls the position of drive device 310 as a function of a DC input voltage received at input connection 320. In some embodiments, the function of mode selection switch 314 is the same or similar to the function of the mode selection switch described in U.S. patent application Ser. No. 14/727,284, filed Jun. 1, 2015, the entire disclosure of which is incorporated by reference herein. For example, the position of mode selection switch 314 may be adjusted to set actuator 300 to operate in a direct acting mode, a reverse acting mode, or a calibration mode.

Mode selection switch 314 is shown to include a 0-10 direct acting (DA) mode, a 2-10 DA mode, a calibration (CAL) mode, a 2-10 reverse acting (RA) mode, and a 0-10 RA mode. According to other exemplary embodiments, mode selection switch 314 may have a greater or smaller number of modes and/or may have modes other than listed as above. The position of mode selection switch 314 may define the range of DC input voltages that correspond to the rotational range of drive device 310. For example, when mode selection switch 314 is set to 0-10 DA, an input voltage of 0.0 VDC may correspond to 0 degrees of rotation position for drive device 310. For this same mode, an input voltage of 1.7 VDC may correspond to 15 degrees of rotation position, 3.3 VDC may correspond to 30 degrees of rotation position, 5.0 VDC may correspond to 45 degrees of rotation position, 6.7 VDC may correspond to 60 degrees of rotation position, 8.3 VDC may correspond to 75 degrees of rotation position, and 10.0 VDC may correspond to 90 degrees of rotation position. It should be understood that these voltages and corresponding rotational positions are merely exemplary and may be different in various implementations.

Referring particularly to FIG. 5, switch 316 may be a mode selection switch having a distinct number or modes or positions. Switch 316 may be provided for embodiments in which actuator 300 is configured to accept an AC voltage at input connection 320. In some embodiments, the function of mode selection switch 316 is the same or similar to the function of the mode selection switch described in U.S. patent application Ser. No. 14/475,141, filed Sep. 1, 2014, the entire disclosure of which is incorporated by reference herein. For example, the position of switch 316 may be adjusted to set actuator 300 to accept various different AC voltages at input connection 320.

Mode selection switch 316 is shown to include a "24 VAC" position, a "120 VAC" position, a "230 VAC" position, an "Auto" position. Each position of switch 316 may correspond to a different operating mode. According to other exemplary embodiments, switch 316 may have a greater or lesser number of positions and/or may have modes other than the modes explicitly listed. The different operating modes indicated by switch 316 may correspond to different voltage reduction factors applied to the input voltage received at input connection 320. For example, with switch 316 in the 24 VAC position, actuator 300 may be configured to accept an input voltage of approximately 24 VAC (e.g., 20-30 VAC) at input connection 320 and may apply a reduction factor of approximately 1 to the input voltage. With switch 316 in the 120 VAC position, actuator 300 may be configured to accept an input voltage of approximately 120 VAC (e.g., 100-140 VAC, 110-130 VAC) at input connection 320 and may apply a reduction factor of approximately 5 (e.g., 3-7, 4-6, 4.5-5.5) to the input voltage. With switch 316 in the 230 VAC position, actuator 300 may be configured to accept an input voltage of approximately 230 VAC (e.g., 200-260 VAC, 220-240 VAC) at input connection 320 and may apply a reduction factor of approximately 9.6 (e.g., 7-13, 8-12, 9-10) to the input voltage. With switch 316 in the "Auto" position, actuator 300 may be configured automatically determine the input voltage received at input connection 320 and may adjust the voltage reduction factor accordingly.

Figure 6:
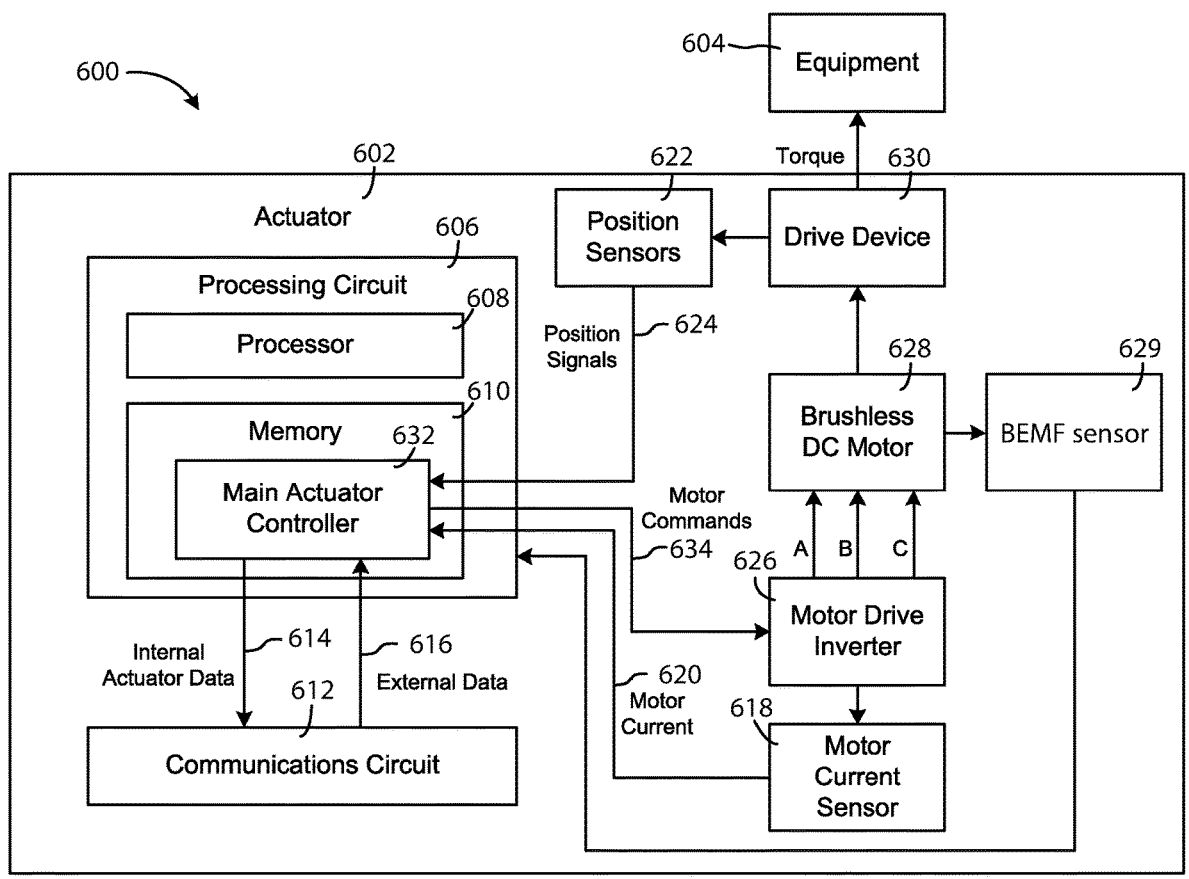
FIG. 6 is a block diagram of a smart actuator that can be implemented in the valve and actuator assembly of FIG. 1, according to some embodiments.

Turning now to FIG. 6, a block diagram of a smart actuator device 600 is shown, according to some embodiments. Smart actuator device 600 may be an actuator that performs control loop functions. For example, applications of smart actuator 600 may include pressure disturbance rejections in actuator control, fan coil control, hydronic system control, 6-way ball valve control for chilled beams, distributed air handling unit (AHU) control, variable water flow (VWF) control, and water system (BEWS) control. Actuator 602 may be configured to operate equipment 604.

Equipment 604 may include any type of device that can be operated by an actuator. In an exemplary embodiment, actuator 602 and equipment 604 (e.g., a valve) are packaged within a common integrated device chassis. In other embodiments, actuator 602 and equipment 604 are packaged as separate components.

Actuator 602 is shown to include a processing circuit 606 communicably coupled to BLDC motor 628. Processing circuit 606 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server).

Memory 610 may include one or more devices (e.g., memory units, memory devices, storage devices) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 606 and may include computer code for executing (e.g., by processor 608) one or more processes described herein. When processor 608 executes instructions stored in memory 610, processor 608 generally configures actuator 602 (and more particularly processing circuit 606) to complete such activities.

Main actuator controller 632 may be configured to receive external control data 616 (e.g., position setpoints, speed setpoints) from communications circuit 612 and position signals 624 from position sensors 622. Main actuator controller 632 may be configured to determine the position of BLDC motor 628 and/or drive device 630 based on position signals 624. In some embodiments, main actuator controller 632 receives data from additional sources. For example, motor current sensor 618 may be configured to measure the electric current provided to BLDC motor 628. Motor current sensor 618 may generate a feedback signal indicating the motor current 620 and may provide this signal to main actuator controller 632 within processing circuit 608.

Still referring to FIG. 6, processing circuit 608 may be configured to output a PWM DC motor command 634 to control the speed of the BLDC motor. BLDC motor 628 may be configured to receive a three-phase PWM voltage output (e.g., phase A, phase B, phase C) from motor drive inverter 626. The duty cycle of the PWM voltage output may define the rotational speed of BLDC motor 628 and may be determined by processing circuit 606 (e.g., a microcontroller). Processing circuit 606 may increase the duty cycle of the PWM voltage output to increase the speed of BLDC motor 628 and may decrease the duty cycle of the PWM voltage output to decrease the speed of BLDC motor 628.

BLDC motor 628 may be coupled to drive device 630. Drive device 630 may be a drive mechanism, a hub, or other device configured to drive or effectuate movement of a HVAC system component (e.g., equipment 604). For example, drive device 630 may be configured to receive a shaft of a damper, a valve, or any other movable HVAC system component in order to drive (e.g., rotate) the shaft. In some embodiments, actuator 602 includes a coupling device configured to aid in coupling drive device 630 to the movable HVAC system component. For example, the coupling device may facilitate attaching drive device 630 to a valve or damper shaft.

Position sensors 622 may include Hall Effect sensors, potentiometers, optical sensors, or other types of sensors configured to measure the rotational position of BLDC motor 628 and/or drive device 630. Position sensors 622 may provide position signals 624 to processing circuit 606. Main actuator controller 632 may use position signals 624 to determine whether to operate BLDC motor 628. For example, main actuator controller 632 may compare the current position of drive device 630 with a position setpoint received via external control data 616 and may operate BLDC motor 628 to achieve the position setpoint.

Actuator 602 is further shown to include BEMF sensor 629, which may be used to determine the BEMF through any known method. For example, BEMF sensor 629 may measure the voltage drop across a motor, and then transmit the measurement to processing circuit 606, which calculates the BEMF based on other known values in the actuator. As an alternative example, BEMF sensor 629 may take inputs from other parts of the electronic circuitry in Actuator 602, such as the supply voltage, and BEMF sensor 629 may use the voltage drop across the motor in combination with other inputs to determine the BEMF, and to transmit the BEMF value of the motor to processing circuit 606. BEMF sensor 629 may provide information to processing circuit 606, processor 608, or main actuator controller 632 for purposes such as actuator control, calibration, reporting, or diagnostics.

Actuator 602 is further shown to include a communications circuit 612. Communications circuit 612 may be a wired or wireless communications link and may use any of a variety of disparate communications protocols (e.g., BACnet, LON, WiFi, Bluetooth, NFC, TCP/IP). In some embodiments, communications circuit 612 is an integrated circuit, chip, or microcontroller unit (MCU) configured to bridge communications actuator 602 and external systems or devices. In some embodiments, communications circuit 612 is the Johnson Controls BACnet on a Chip (JBOC) product. For example, communications circuit 612 can be a pre-certified BACnet communication module capable of communicating on a building automation and controls network (BACnet) using an MSTP protocol. Communications circuit 612 can be added to any existing product to enable BACnet communication with minimal software and hardware design effort. In other words, communications circuit 612 provides a BACnet interface for smart actuator device 600. Further details regarding the JBOC product are disclosed in U.S. patent application Ser. No. 15/207,431 filed Jul. 11, 2016, the entire disclosure of which is incorporated by reference herein.

Communications circuit 612 may also be configured to support data communications within actuator 602. In some embodiments, communications circuit 612 may receive internal actuator data 614 from main actuator controller 632. For example, internal actuator data 614 may include the sensed motor current 620, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve), or any other type of data used or stored internally within actuator 602. In some embodiments, communications circuit 612 may transmit external control data 616 to main actuator controller 632. External data 616 may include, for example, position setpoints, speed setpoints, control signals, configuration parameters, end stop locations, stroke length parameters, commissioning data, equipment model data, actuator firmware, actuator software, or any other type of data which can be used by actuator 602 to operate BLDC motor 628 and/or drive device 630.

Automatic Force Setting through BEMF Analysis

After an actuator has been assembled, it may undergo a break-in process. This may be performed at the factory where the actuator is assembled, and the actuator may be placed in a break-in rig to facilitate the process. During the break-in process, the actuator is coupled to a load with known properties, which may include the force required to move the load. For example, the load may be a torsion spring. Subjecting an actuator to a break-in process enables components to settle into their final positions, lubricants to be distributed between connected components, and other processes that prepare the actuator for use.

Figure 7:
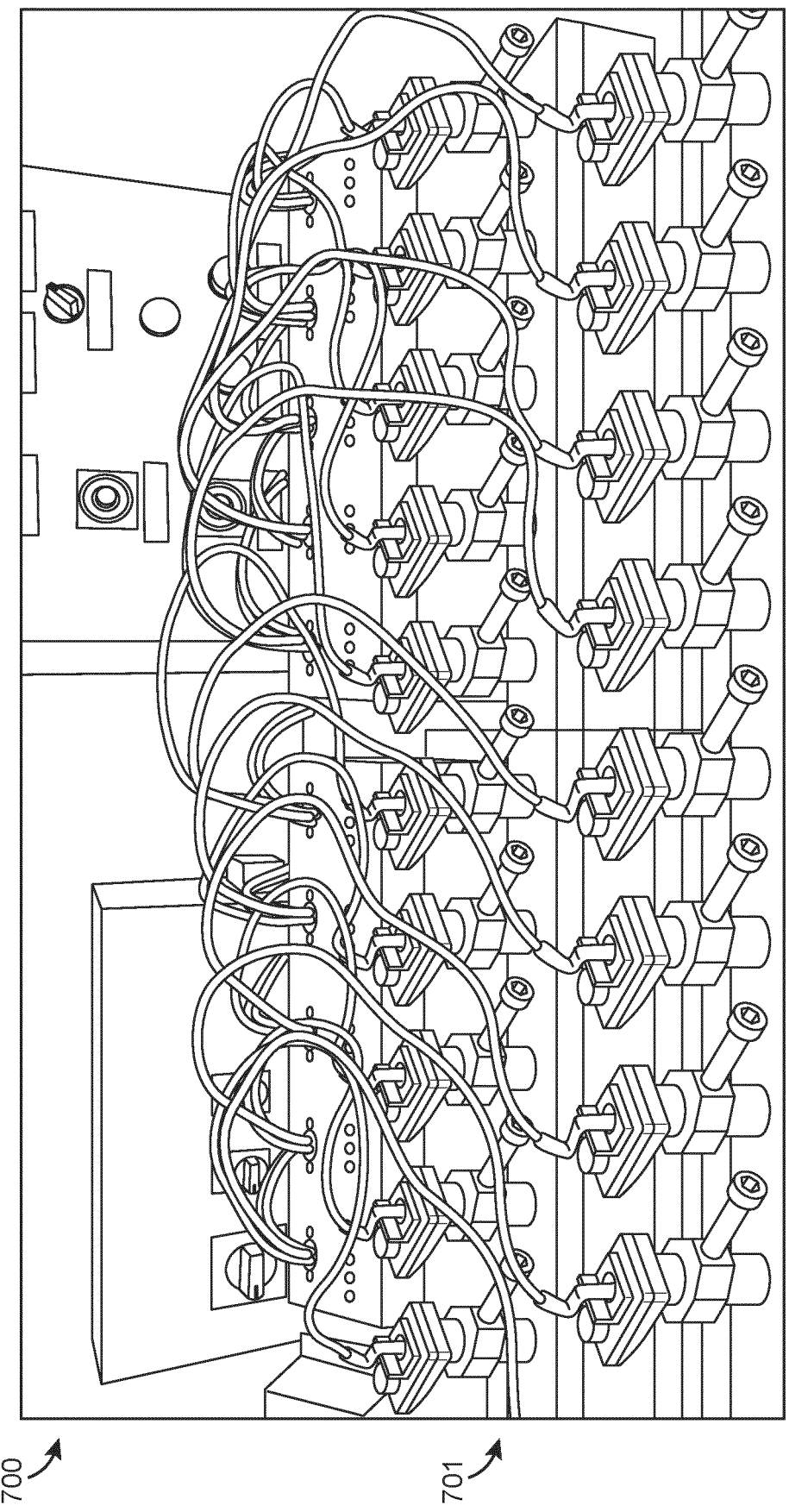
FIG. 7 is a view of a break-in machine comprising a plurality of break-in rigs, according to some embodiments.

FIG. 7 shows a calibration machine, according to some embodiments. Calibration machine 700 comprises two rows of break-in rigs 701. This arrangement enables multiple actuators to undergo a break-in process simultaneously, or for some actuators to undergo a break-in process while other actuators are removed from or attached to other rigs.

Figure 8:
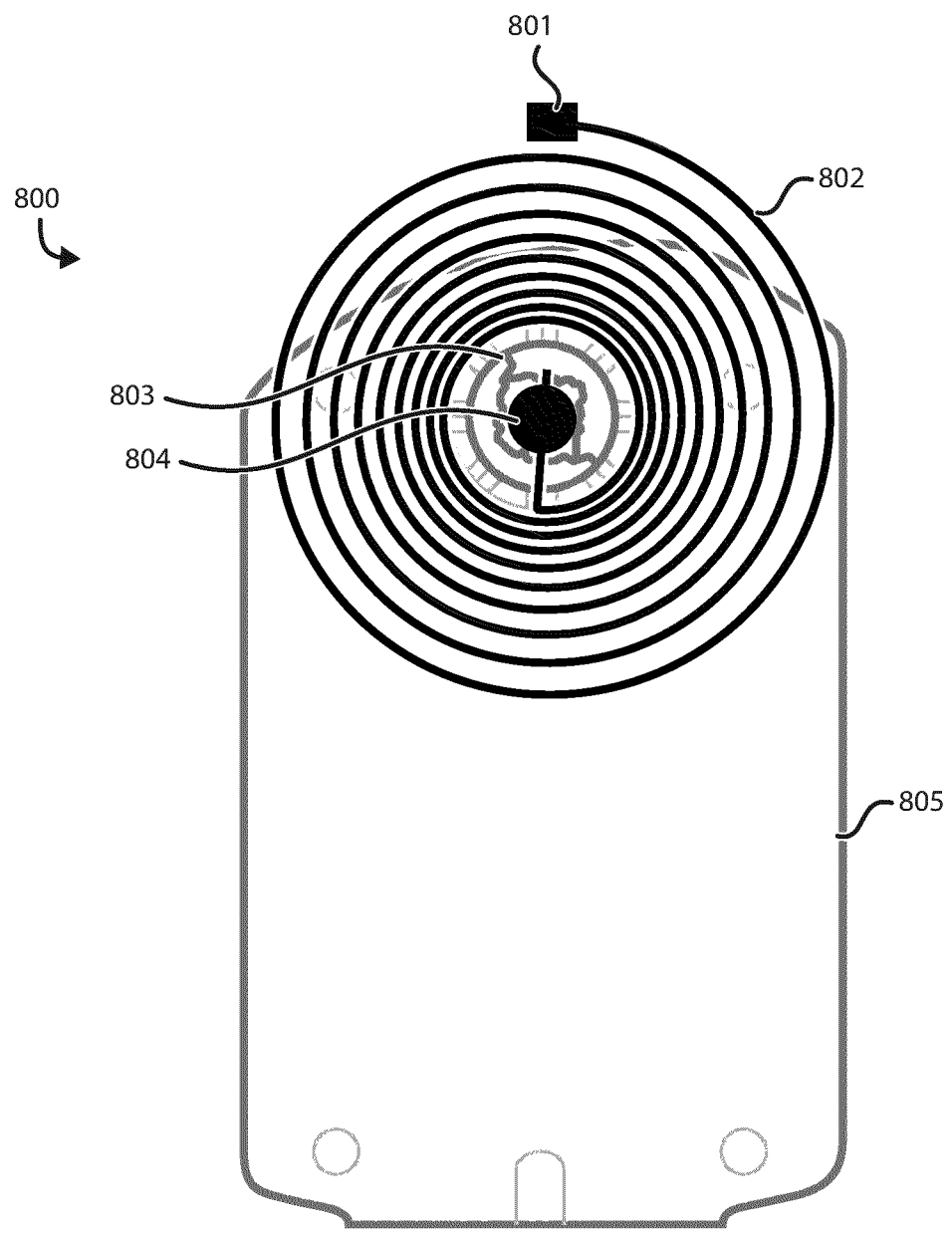
FIG. 8 is a bottom view drawing of the components of an actuator break-in rig, according to some embodiments.

An example arrangement of a break-in rig is shown in FIG. 8. Actuator housing 805 may be attached to a stand, platform, table, frame, or other fixed-position structure (not shown), through the use of bolts, screws, quick release clamps, or other attachment method. The position of spring anchor 801 is also fixed relative to actuator housing 805. Coupling device 803 may be coupled to spring winding rod 804, such that rotation of coupling device 803 causes rotation of spring winding rod 804. In some embodiments, spring winding rod 804 may have a cross section that is triangular, square, hexagonal, or some other shape to improve the transfer of force from coupling device 803 to spring winding rod 804. One end of torsion spring 802 is coupled to spring winding rod 804, and to the other end of torsion spring 802 is coupled to spring anchor 801.

In some embodiments, a switch on an actuator, such as one of switches 314-316 of FIG. 3, is used to command the actuator to enter the break-in process state. In some embodiments, an actuator is commanded to enter the break-in process state through a wired or wireless connection to an external device.

During the break-in process, the BEMF generated by the motor may be measured. In a smart actuator, the actuator's microprocessor may record values from sensors within the actuator in order to determine the BEMF. Probes may also be attached to an actuator's electronic components at various points, with values read by external sensors, in order to determine the motor BEMF.

In some embodiments of the break-in process, the load, such as a spring, provides an opposing force to the actuator in only one direction. The force exerted by such a load works against the motor of an actuator when the motor rotates in one direction, and then with the motor of the actuator when the motor rotates in the opposite direction. In some embodiments, the different effects of the load are taken into account when measuring the motor BEMF and performing subsequent calculations. In some embodiments, the load provides an opposing force for both directions in which the motor operates. For example, the load may be a mass that is moved horizontally, and where the resistance is produced by friction.

Since motor BEMF is proportional to the rotational speed of a motor, assessing the BEMF of a motor is equivalent to assessing the movement of the motor, and in turn the movement of elements coupled to the motor. Setting a target value for the motor BEMF is equivalent to setting a target rotational speed. This target value for the motor BEMF will henceforth be referred to as the BEMF setpoint.

In some embodiments, the purpose of this automatic adjustment is to obtain a desired force output from the actuator. If the force required to work against a load is known, then the speed at which a motor is rotating can be used to determine the force being exerted on the load.

In some embodiments the BEMF setpoint is determined through calculation. For example, if the actuator is connected to a spring, Hooke's law may be used to calculate the rotational motion required to exert the desired force on the spring, and then a further calculation performed to determine the motor BEMF that is equivalent to the rotational motion. The speed of rotation of the motor may also be used to determine periods of acceleration and deceleration, which, in combination with the known mass of a load, could be used to determine the force exerted. The force may also be calculated as that required to work against friction, to raise a mass against gravity, to exceed a stall torque and begin moving a load, or through some other method.

In some embodiments, the BEMF setpoint is determined through experimentation and/or mapping the BEMF output of a reference actuator, with the aim of matching all subsequently tested actuators to that mapping.

Figure 9:
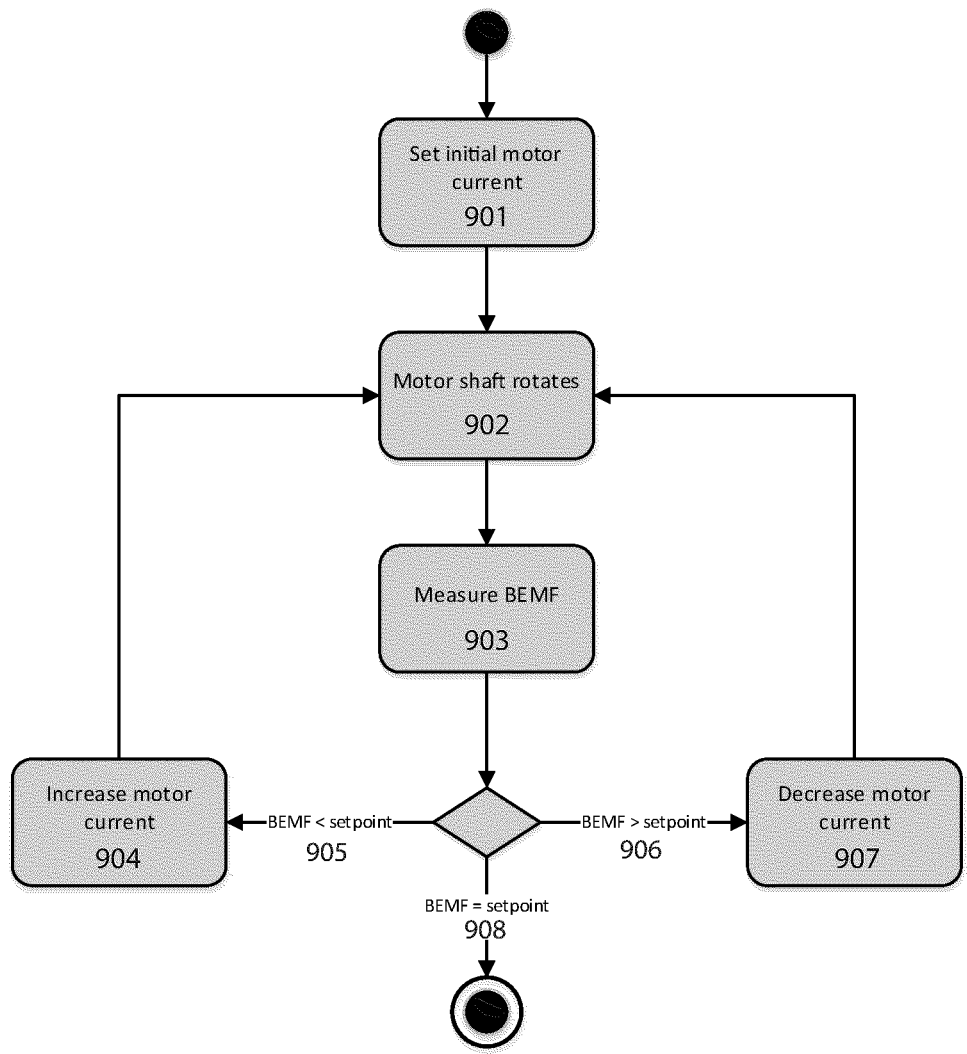
FIG. 9 is a process diagram for the calibration of motor current in an actuator, according to some embodiments.

FIG. 9 shows an example process that uses a measured motor BEMF value to automatically adjust the force exerted by an actuator during a break-in process. An initial motor current is selected 901 and applied to the actuator motor. The actuator motor acts on the known load 902, and the motor BEMF is measured 903. The measured motor BEMF is compared against the BEMF setpoint. If the measured motor BEMF is less than the BEMF setpoint 905, then the motor current is increased 904. If the measured motor BEMF is greater than the BEMF setpoint 906, then the current is decreased 907.

The motor current may be adjusted through any known method, including, but not limited to, use of voltage dividers, voltage regulators, current amplifiers, relays, or integrated circuits.

The break-in process may continue until the measured motor BEMF equals the BEMF setpoint 908, until the measured motor BEMF is within a configured tolerance of the BEMF setpoint, for a set number of repetitions, or a set period of time.

If the break-in process ends because the measured motor BEMF equals the BEMF setpoint 908, then the value of the motor current is recorded as the operating motor current for that actuator. The operating motor current may be recorded in memory on the actuator, such as in solid state memory or on an EEPROM.

If the break-in process ends with the measured motor BEMF not equaling the BEMF setpoint, or not being within a configurable deviation from the BEMF setpoint, then the break-in process may be determined to have failed. An actuator may indicate the failure through a visual display on the actuator, by transmitting a failure code to an external system, or through some other method. In some embodiments, the number of failures is counted and recorded. If the number of failures within a set period of time exceeds a threshold value, then an alert may be raised. For example, an alert may be transmitted to a factory to cease manufacture and investigate the cause of the excessive faults.

In some embodiments, the initial motor current that is selected at the start of the break-in phase is modified based on the results of previous break-in operations. In some embodiments, the final motor current value that is set at the end of an actuator's break-in phase may be used as the initial motor current value for the following actuator. In some embodiments, an average of final motor current values is used. For example, the average may be an average of the final motor current values from the previous day, may be an average of the last ten final motor current values, or some other average. In some embodiments, another method of calculating an initial motor current value may be used to quickly respond to large deviations in final motor current values, to reduce noise caused by widely varying final motor current values, or to achieve some other objective. These methods may be used to respond to variations in manufacturing runs.

In some embodiments, safety limits are built into the break-in process. For example, there may be maximum and minimum motor current limits. When, as part of the break-in process, there is a decision to either increase the motor current or to decrease the motor current, then the new value for the motor current is the target motor current. If the break-in process leads to selecting a target motor current value that is outside of the current limits, then the break-in process may be interrupted and a fault warning may be generated. In some embodiments, if the difference between the measured motor BEMF and the BEMF setpoint is determined to be increasing, then the break-in process may be interrupted and a fault warning may be generated. In some embodiments, the break-in process is not interrupted, but instead the process continues with a motor current value that is within allowed limits. A fault alert may then be generated at the end of the break-in process if the target motor current value has not moved within acceptable limits.

In some embodiments, a profile is developed for how the measured motor BEMF should vary over an actuator's range of motion. Some loads may provide varying resistive force during the range of motion of the actuator. For example, an extension spring attached to the end of an arm that is rotated may provide varying resistive force depending on whether it is being moved predominantly tangentially or away from an anchor point.

Figure 10:
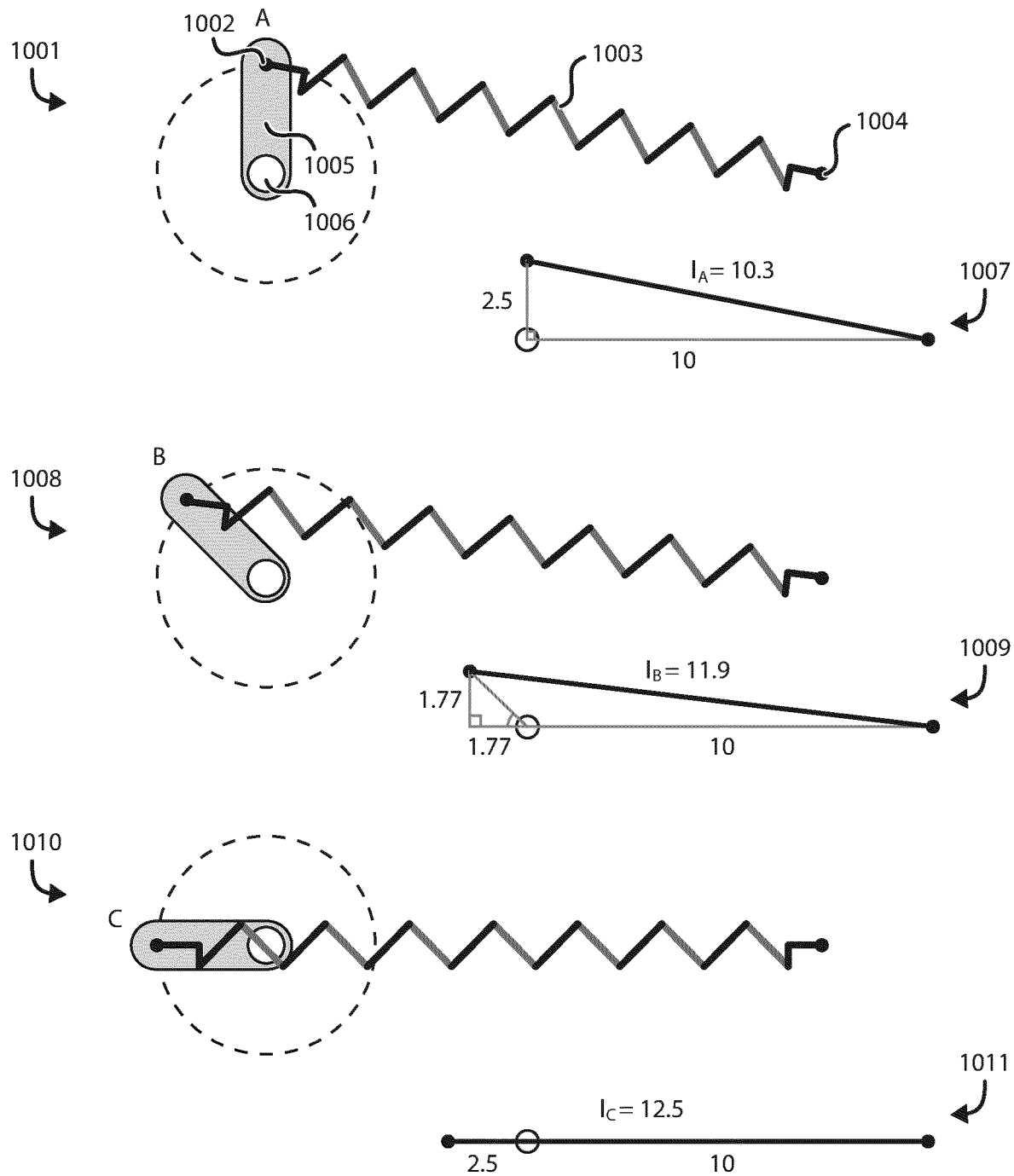
FIG. 10 is a sequence of diagrams of the effect that a rotating actuator may have on an extension spring, according to some embodiments.

FIG. 10 shows an example arrangement with an extension spring. Actuator coupling device, such as coupling device 312 of FIG. 3, is connected to rotor arm 1005 at pivot point 1006. Extension spring 1003 is connected to fixed anchor point 1004 and rotor arm 1005 at point 1002. When rotor arm 1005 is at position A 1001, the length $l_A$ of spring 1003 is 10.3 inches, as shown in diagram 1007. When rotor arm 1005 rotates 45 degrees to position B 1008, the length $l_B$ of spring 1003 is 11.9 inches, as shown in diagram 1009. When rotor arm 1005 rotates a further 45 degrees to position C 1010, the length $l_C$ of spring 1003 is 12.5 inches, as shown in diagram 1011. Although the angle of rotation from both position A to B and from position B to C is 45 degrees, the extension of spring 1003 is different in the two segments. The extension of spring 1003 from position A to B is 1.6 inches, while the extension of spring 1003 from position B to C is 0.6 inches.

Figure 11:
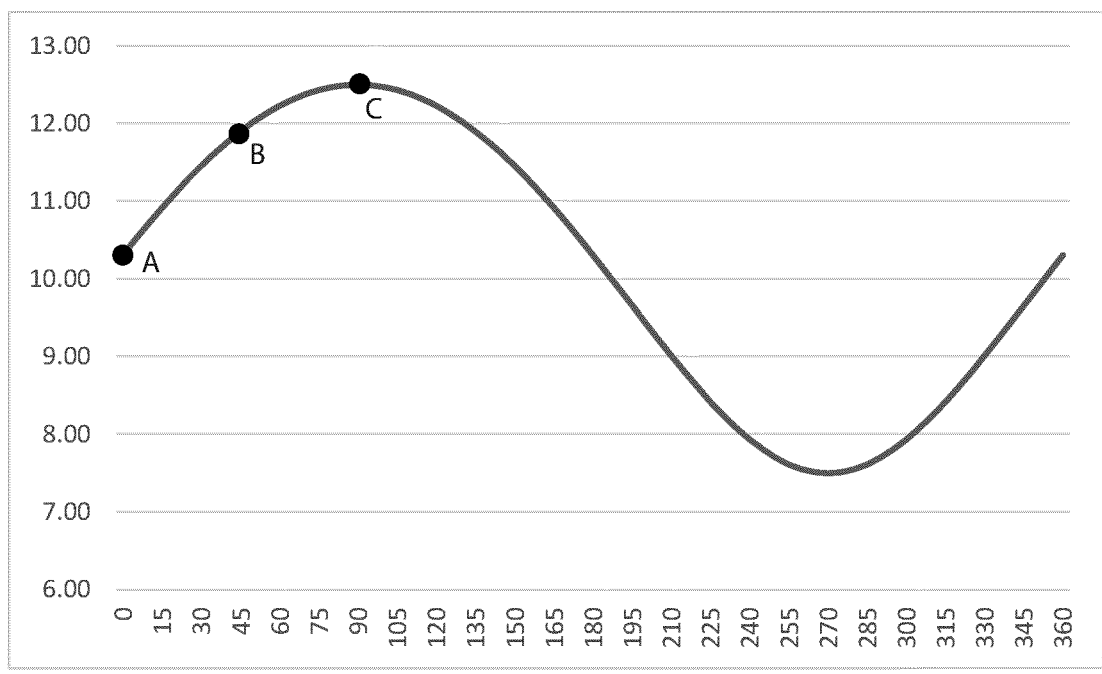
FIG. 11 is a graph of changing length in an extension spring when coupled to a rotating actuator, according to some embodiments.

FIG. 11 shows a graph of how the angle of rotation of the rotor arm 1005 (x axis) would affect the length of spring 1003. The location of points A, B, and C are marked. Note that spring 1003 would only provide an opposing force when the gradient in the graph is positive.

In some embodiments, the measured motor BEMF is compared against the BEMF setpoint for only a portion of the actuator's range of motion. For example, during a period where exerted force is expected to be constant. In some embodiments, the measure motor BEMF is compared against the BEMF setpoint at specific points in an actuator's range of motion, which may include a single measurement taken at a single point in each cycle of motion.

Self-Calibrating Actuator

After an actuator has been assembled, it may undergo a force calibration process. This may be performed at the factory where the actuator is assembled, and the actuator may be placed in a force calibration rig. The force calibration process may be performed on an actuator after that actuator has undergone a break-in process. During the force calibration process, the actuator works against a force sensor, such as a force cell, strain gauge, force-sensitive resistor, or other sensor.

Figure 12:
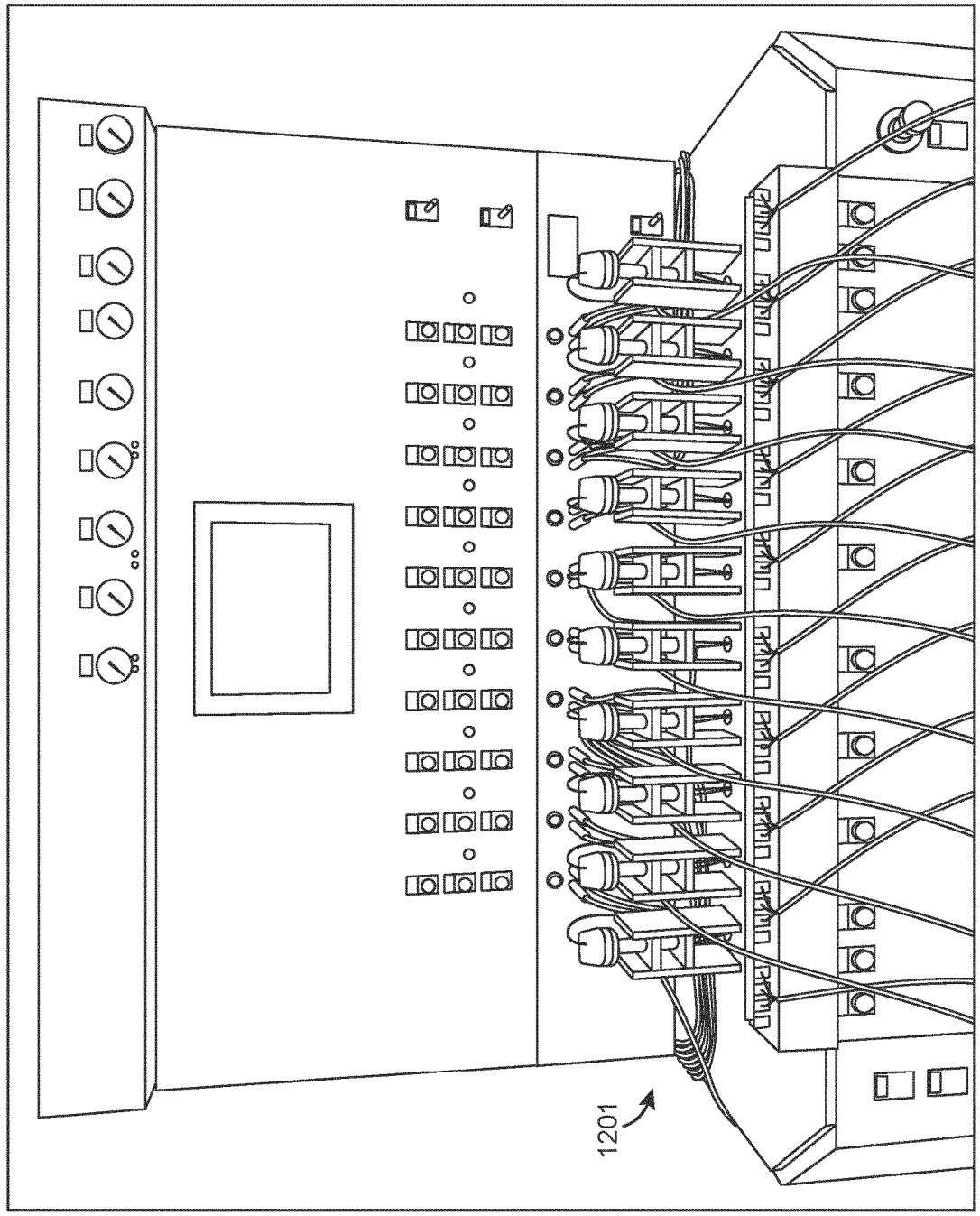
FIG. 12 is a view of a calibration machine comprising a plurality of a calibration rigs, according to some embodiments.

FIG. 12 shows a calibration machine, according to some embodiments. Calibration machine 1200 comprises multiple calibration rigs 1201. This arrangement enables multiple actuators to undergo calibration simultaneously, or for some actuators to undergo a calibration process while other actuators are removed from or attached to other rigs.

Figure 13:
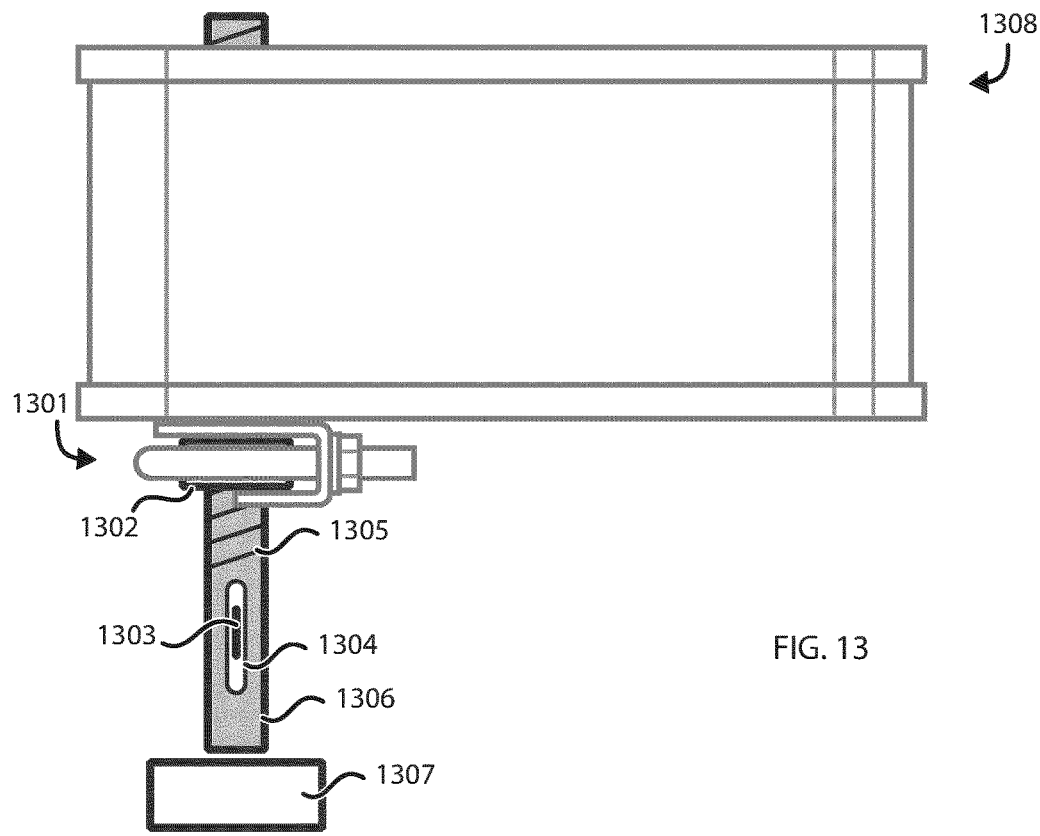
FIG. 13 is a side view drawing of a calibration rig, according to some embodiments.
Figure 14:
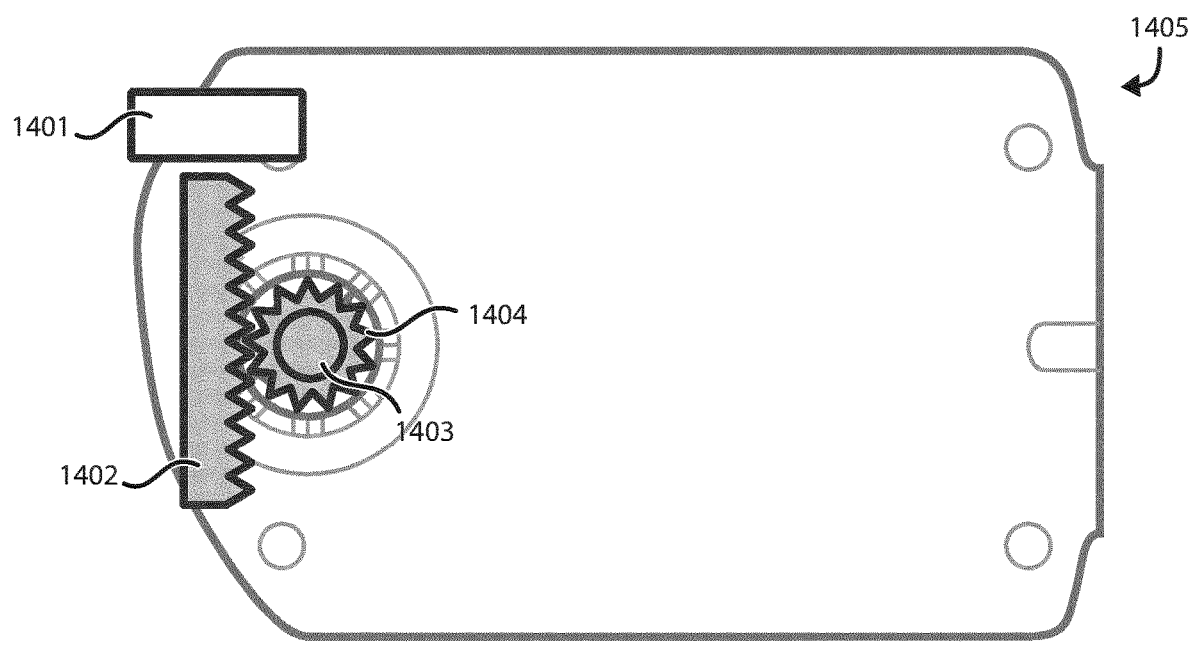
FIG. 14 is a bottom view drawing of a calibration rig, according to some embodiments.

FIG. 13 shows a calibration rig, according to some embodiments. Coupling device 1301 couples threaded nut 1302 to drive mechanism of actuator 1308. Pin 1306 comprises threaded section 1305 that engages with threads in threaded nut 1302. Pin 1306 may further comprise groove 1303 that receives guide 1304. Rotation of drive mechanism in actuator 1308 causes threaded nut 1302 to rotate. Guide 1304 prevents the rotation of pin 1306, and ensures that rotation force applied by threaded nut 1302 is converted to vertical motion of pin 1306. When drive mechanism of actuator 1308 rotates in a first direction, pin 1306 applies force to force sensor 1307.

FIG. 13 shows a calibration rig, according to some embodiments. Coupling device (not shown) couples shaft 1403 to drive mechanism of actuator 1405. Shaft 1403 is coupled to pinion 1404. Teeth of pinion 1404 engage with teeth of rack 1402. Rotation of drive mechanism in actuator 1405 causes pinion 1404 to rotate, and in turn drive rack 1402. When drive mechanism of actuator 1405 rotates in a first direction, rack 1402 applies force to force sensor 1401. In some embodiments, a second force sensor is positioned at the opposite end of rack 1402, such that when drive mechanism of actuator 1405 rotates in a second, reverse, direction, rack 1402 applies force to the second force sensor.

In some embodiments, a switch on an actuator, such as switches 314-316 of FIG. 3, is used to command the actuator to enter the force calibration process state. In some embodiments, an actuator is commanded to enter the force calibration process state through a wired or wireless connection to an external device.

In some embodiments, an actuator is coupled to a force sensor such that force is exerted on the force sensor when the actuator motor is driven in one direction, but no force is exerted when the actuator motor is driven in the opposite direction. In some embodiments, an actuator is coupled to a force sensor such that force is exerted on a first force sensor when the actuator motor is driven in one direction, and force is exerted on a second force sensor when the actuator motor is driven in the opposite direction. In some embodiments, an actuator is coupled to a force sensor that can measure force exerted by the actuator motor regardless of the direction in which it is driven. For example, a load cell that can measure both compression and tension forces.

In some embodiments, the force sensor is static, and the force measured is that exerted by the actuator motor as it acts on an immovable object. In some embodiments, the force sensor is mounted on a movable arm, sled, swing, or other arrangement that enables the actuator to move the force sensor. In this latter configuration, the force measured is that exerted by the actuator motor as it moves the force sensor when opposed by friction, gravity, the compression or extension of a linear spring, the coiling of a spiral spring, the compression of a pneumatic piston, or some other force.

In some embodiments, the force sensor transmits its measured value to the microprocessor of a smart thermostat. In some embodiments, an intermediary processor records the value recorded by the force sensor and transmits the value to the smart actuator through BACnet, Modbus, LonTalk, Zigbee, IP, or other network protocol. In some embodiments, the force sensor is attached as a sensor directly to the smart actuator and provides an analog or binary encoded representation of the sensor reading.

Figure 15:
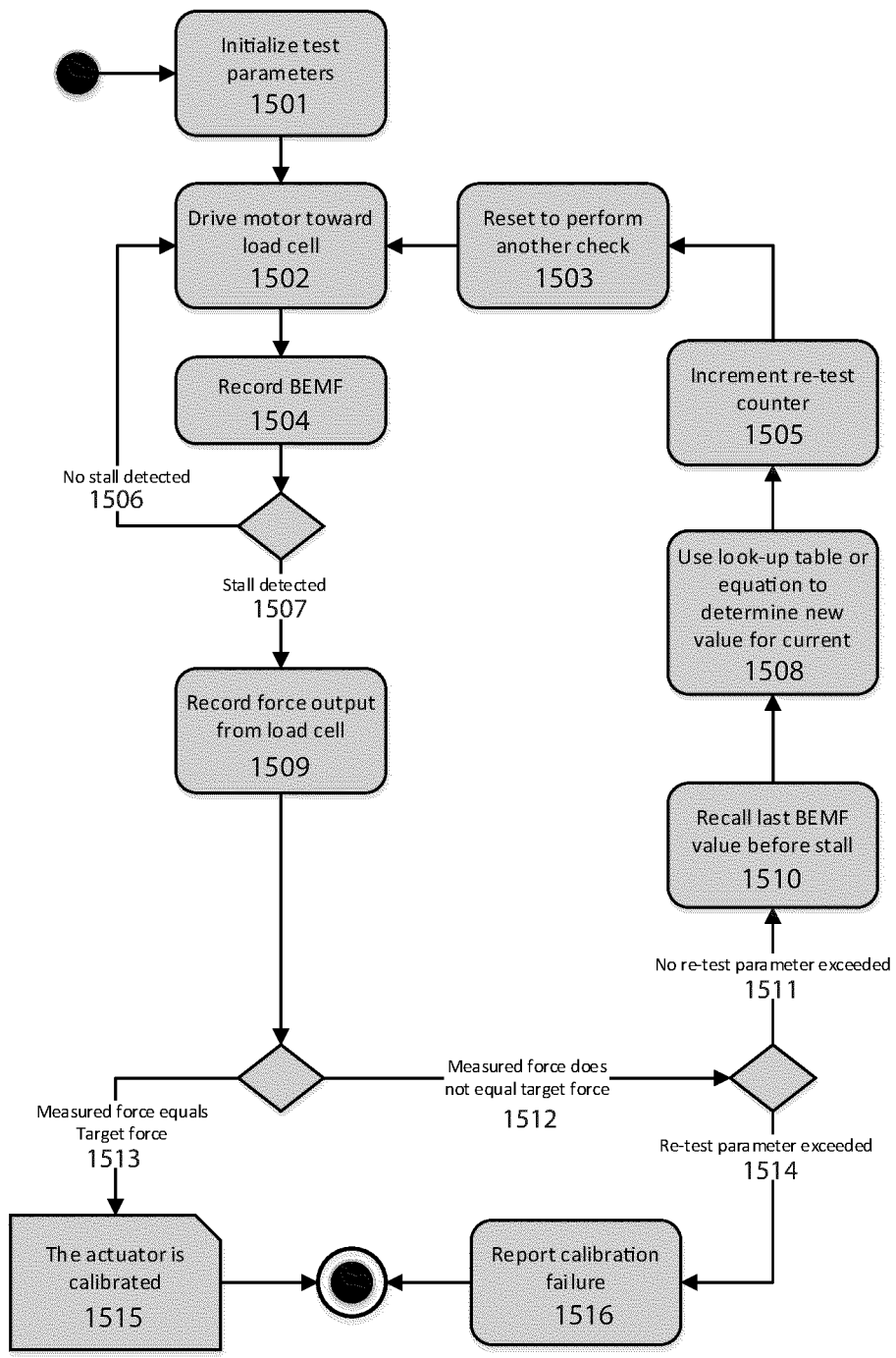
FIG. 15 is a process diagram for the calibration of motor current in an actuator, according to some embodiments.

FIG. 15 shows an example embodiment of a calibration process. At the start of the calibration process, the required test parameters are initialized 1501. For example, an initial motor current is selected, a target force value is selected, a timer may be started, and a cycle counter may be set to zero. The initial current for the calibration process may be the final current from the break-in process. The motor is then driven to act on the load cell 1502, and the motor BEMF is recorded 1504. The cycle of driving the motor and recording the motor BEMF is repeated while no stall is detected 1506.

When the actuator detects a stall 1507, the actuator processor records the measurement from the load cell 1509. A stall may be determined by drop in BEMF, by an increase in current draw, by positions sensors, such as position sensor 622 of FIG. 6, or some other method. The force value recorded for the load cell may be the last measured value, the value that was recorded at a configurable interval before the stall, the peak force value, or some other sampling. If the measured force value equals the target force value 1513, then the actuator is correctly calibrated 1515, and the calibration process ends.

In some embodiments, the actuator is determined to be correctly calibrated, and so the calibration process ends, if the measured force value is within a configured range of the target force value. In some embodiments, where the measured force value is initially greater than the target force value, the actuator is determined to be correctly calibrated when the measured force value is below a threshold value. In some embodiments, where the measured force value is initially lower than the target force value, the actuator is determined to be correctly calibrated when the measured force value exceeds a threshold value.

If the measured force value does not equal the target force value 1512, then the actuator is not correctly calibrated. Parameters, such as the motor current, may be adjusted, and the actuator re-tested.

In some embodiments, re-test parameters are monitored to prevent infinite retests. For example, a re-test counter may be used. The re-test counter may be initialized to zero during test parameter initialization 1501, and incremented after each failed test 1505. If the re-test counter exceeds a configurable threshold value 1514, then the test may end and a fault alert may be generated. In some embodiments, a timer may be initialized during test parameter initialization 1501. If the timer exceeds a configurable threshold value 1514, then the test may end and a fault alert may be generated. The fault alert may be a visual or audible alert generated by the actuator or components on the calibration rig, or any other method of alerting a person to the fault.

If a re-test is to be performed 1511, then the measured value of motor BEMF is recalled 1510. The motor BEMF value to be used may be the last measured value, the value that was recorded at a configurable interval before the stall, the peak motor BEMF value, or some other sampling. A new value for the motor current is then selected 1508. In some embodiments a look-up table is used, which is either stored locally on the actuator or retrieved through communication with an external data source. Table 1 shows a sample portion of a look-up table. In this case, the force value measured by the force sensor and the motor BEMF value measured by BEMF sensor 629 of FIG. 6 are used to look-up a new motor current value. In some embodiments, where motor BEMF is equivalent to motor speed, and so equivalent to exerted force, each entry for a measured force has a single row in the look-up table, with a single corresponding motor BEMF. In this case, the measured force and measured BEMF may be compared in order to detect faults and/or for error checking.

TABLE 1

Sample look-up table for motor current

| Force (N) | Motor BEMF (V) | Motor Current (mA) |
|---|---|---|
| 145 | 2.50 | 49.0000 |
| 146 | 2.55 | 46.5823 |
| 147 | 2.60 | 44.3730 |
| 148 | 2.65 | 42.3633 |
| 149 | 2.70 | 40.5440 |
| 150 | 2.75 | 38.9063 |
| 151 | 2.80 | 37.4410 |
| 152 | 2.85 | 36.1393 |
| 153 | 2.90 | 34.9920 |
| 154 | 2.95 | 33.9903 |
| 155 | 3.00 | 33.1250 |
| 156 | 3.05 | 32.3873 |
| 157 | 3.10 | 31.7680 |
| 158 | 3.15 | 31.2583 |
| 159 | 3.20 | 30.8490 |
| 160 | 3.25 | 30.5313 |

In some embodiments, there are multiple rows for each measured force, each of which has a different motor BEMF value and corresponding motor current value. Motor BEMF values may also have multiple entries in the look-up table, each associated with a different measured force and corresponding motor current value. In some embodiments, additional parameters are included in the look-up table, such as temperature, humidity, or calibration process cycle count.

Different look-up tables may be used for different models of actuator, different models of force sensor, different models of power supply unit, different calibration rigs, whether an actuator is new or refurbished, whether an actuator has previously undergone calibration during the break-in process, or some other factor.

Figure 16:
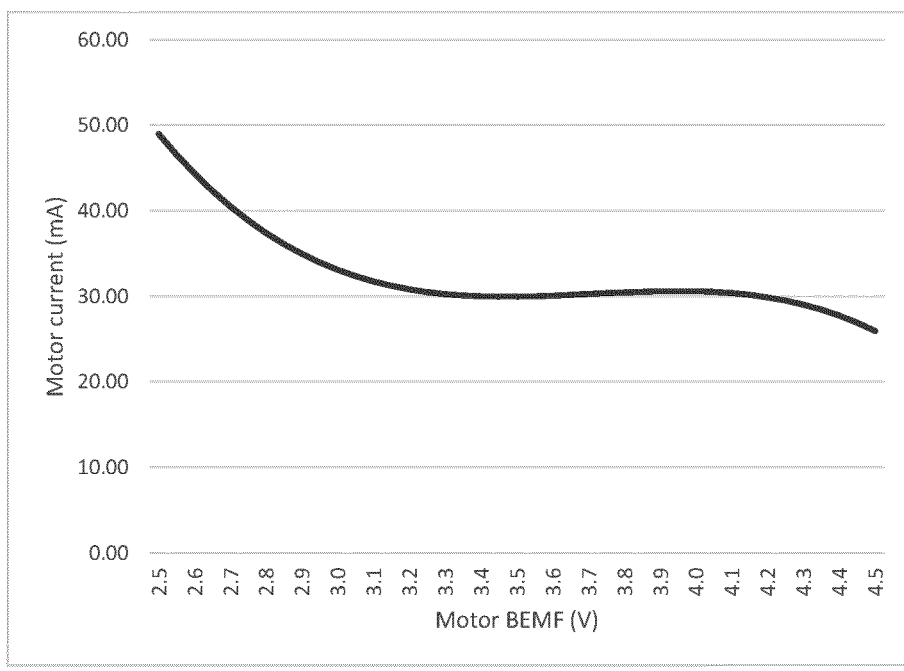
FIG. 16 is a graph of calibrated motor current values and measured motor BEMF, according to some embodiments.

In some embodiments, where measured values fall between entries in a look-up table, interpolation is used to determine the motor current value. For example, in reference to Table 1, if the measured force was 151.5 N and the measured BEMF was 2.825 V, the calculated motor current may be half way between 37.4410 mA and 36.1393 mA. In some embodiments, the interpolation is linear. In some embodiments, the interpolation follows a curve, such as that shown in FIG. 16, or is weighted towards the higher or lower value. In some embodiments, more than two values from the look-up table are used in the calculation of the interpolated value.

In some embodiments, the ideal motor current value is calculated using an equation. The equation may be parametric equation that represents a linear relationship, an exponential relationship, a relationship that is represented by some form of curve, or some other type of relationship. In some embodiments, a plurality of equations are used, with each equation valid within set bounds. For example, the graph shown in FIG. 16 may be approximated by the following equations:

| | | |
|---|---|---|
| $I = 30 + (5(3.3 - \varepsilon_b))^{2.1}$ | where | $0 < \varepsilon_b < 3.30$ |
| $I = 30$ | where | $3.30 <= \varepsilon_b < 4.25$ |
| $I = 30 - (10.1(\varepsilon_b - 4.2))^{1.2}$ | where | $4.25 <= \varepsilon_b$ |

The actuator is then prepared for the re-test 1503. This may include, but is not limited to, driving the motor in the reverse direction to an initial position and re-initializing parameters such as last recorded motor BEMF and force value.

In some embodiments, the calibration is performed by a calibration device that receives sensor readings from both the force sensor and BEMF sensor. The calibration device may transmit calibration data to a smart actuator; may record calibration settings on data storage on an actuator, such as solid state memory, EEPROM, or other memory device; may save information to a configuration file along with information that identifies the specific actuator that the configuration information applies to; initiate the printing of a physical label that contains configuration information and is attached to the sensor actuator; or use some other method to record calibration settings.

In some embodiments, calibration settings are displayed to a technician who then records the information on a label attached to the actuator, in a physical document that may be shipped with an actuator, in a digital file, or on some other medium. In some embodiments, calibration settings are displayed to a technician who then adjusts physical electrical components on the actuator, such as potentiometers, rheostats, DIP switches, rotary switches, or jumpers. The purpose of adjusting physical electrical components may be to apply a configuration settings. For example, a technician may adjust a potentiometer that is part of a voltage divider circuit until the voltage in part of the circuit matches the displayed configuration setting. Alternatively, the purpose may be to step up or step down an electrical property, such as voltage or current, within a circuit, with the electrical property then subsequently adjusted by additional electronic components to achieve the configured value. The purpose of stepping up or stepping down an electrical property may be to protect components within the circuit, to move an electrical property within the operating range of an active electronic component, to reduce the loss of energy through heat, or for some other purpose.

In some embodiments, configuration information is transferred to the system to which the actuator is connected. For example, configuration information may be transferred to a building automation system, or to a specific building automation system controller. The configuration information may include the current that the controller should provide to the actuator. Where multiple actuators are connected to a controller, the configuration information may indicate that the controller must supply a different current to each actuator.

In some embodiments, the actuator comprises a force sensor. When a stall is detected, a measurement of force may be taken from the actuator's force sensor, rather than from a separate load cell.

In some embodiments, where an actuator can be operated in different modes with different voltage levels, the break-in process and/or force calibration process may be performed multiple times—once for each voltage level that the actuator can operate in.

In some embodiments, information about how configuration settings should change over time may be generated. The requirement to change configuration settings over time may be in response to degradation of the actuator. For example, the supplied current may need to be gradually increased over time to compensate for wear in an actuator. Data gained during the break-in process and/or force calibration process may be used to determine how configuration settings should change over time. This may include, but is not limited to, rate in change with regards to time; rate of change with regards to cycles of use; minimum value; maximum value; an equation to calculate a new value based on one or more sensed values, which may include BEMF; or selecting a value from a table based on one or more sensed values, which may include BEMF.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

It will also be clear to somebody skilled in the art that embodiments described in relation to automatic force setting through BEMF analysis are also applicable to self-calibration, and that embodiments described in relation to self-calibration are also applicable to automatic force setting through BEMF analysis.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of calibrating a supply of electrical current in an actuator, comprising:
   supplying an initial electrical current to a motor of an actuator;
   measuring a back-electromotive force (BEMF) corresponding to the motor as the initial electrical current is supplied to the motor;
   comparing the measured BEMF to an expected BEMF;
   adjusting by increasing or decreasing a supply of the initial electrical current to the motor until the measured BEMF substantially matches the expected BEMF; and
   storing data regarding an association between the adjusted supply of initial electrical current and the expected BEMF, to calibrate supply of electrical current to the motor.

2. The method of claim 1, wherein a value of the adjusted supply of electrical current is stored as a parameter in a memory on the actuator.

3. The method of claim 1, further comprising:
   coupling said actuator to a load; and
   determining the expected BEMF to be measured in the motor working against said load.

4. The method of claim 1, wherein measuring the BEMF comprises measuring at least one of a BEMF of the motor or a BEMF of an output of the motor.

5. The method of claim 1, further comprising determining whether a stall condition is detected as the initial electrical current is supplied to the motor.

6. The method of claim 5, further comprising storing a force output of the motor responsive to determining that the stall condition is detected.

7. The method of claim 5, wherein comparing the measured BEMF to the expected BEMF is responsive to the stall condition being detected.

8. The method of claim 7, wherein the measured BEMF is measured prior to detection of the stall condition, and wherein the expected BEMF is determined for the current using at least one of a look-up table or an equation.

9. The method of claim 1, wherein adjusting the initial current comprises increasing the initial current responsive to the measured BEMF being less than the expected BEMF.

10. The method of claim 1, wherein adjusting the initial current comprises decreasing the initial current responsive to the measured BEMF being greater than the expected BEMF.

11. A method of calibrating electrical current supply to an actuator, comprising:

determining, for a motor, a relationship between values of at least two of:
- an electrical current supplied to the motor;
- a back-electromotive force (BEMF) generated by the motor; or
- a force exerted by the motor;

coupling the motor to a force sensor;
supplying an initial electrical current to the motor;
measuring values of at least one of the BEMF generated by the motor or the force exerted by the motor while the initial current is supplied to the motor;
increasing or decreasing a supply of the initial electrical current to the motor based on the determined relationship and the measured values; and
storing data regarding an association between the adjusted supply of the initial electrical current and the determined relationship, to calibrate supply of electrical current to the motor.

12. The method of claim 11, further comprising determining whether a stall condition is detected as the initial electrical current is supplied to the motor.

13. The method of claim 12, further comprising storing a force output of the motor responsive to determining that the stall condition is detected.

14. The method of claim 12, wherein the measured BEMF is measured prior to detection of the stall condition, and wherein an expected BEMF is determined for the current using at least one of a look-up table or an equation.

15. The method of claim 11, wherein the relationship is between the electrical current supplied to the motor and at least one of the BEMF generated by the motor or the force exerted by the motor.

16. A system for calibrating electrical current supply to a motor, the system comprising:
- a motor;
- one or more sensors configured to measure a condition corresponding to the motor;
- a processing circuit comprising one or more processors and memory, the memory storing instructions that, when executed by the one or more processors, cause the one or more processors to:
  - supply an initial electrical current to the motor;
  - measure, via the one or more sensor(s), the condition corresponding to the motor as the initial electrical current is supplied to the motor;
  - compare the measured condition to an expected condition;
  - increase or decrease a supply of the initial electrical current to the motor until the measured condition substantially matches the expected condition; and
  - store data regarding an association between the adjusted supply of initial electrical current and the expected condition, to calibrate supply of electrical current to the motor.

17. The system of claim 16, wherein the condition comprises at least one of a back-electromotive force (BEMF) generated by the motor, or a force exerted by the motor.

18. The system of claim 16, wherein the memory comprises non-volatile memory, and wherein storing the association comprises storing the association in the non-volatile memory.

19. The system of claim 16, wherein the condition comprises a back-electromotive force (BEMF) corresponding to the motor, wherein the expected condition comprises an expected BEMF, and wherein adjusting the initial electrical current comprises increasing the initial electrical current responsive to the measured BEMF being less than the expected BEMF.

20. The system of claim 16, wherein the condition comprises a back-electromotive force (BEMF) corresponding to the motor, wherein the expected condition comprises an expected BEMF, and wherein adjusting the initial electrical current comprises decreasing the initial electrical current responsive to the measured BEMF being greater than the expected BEMF.

* * * * *